United States Patent
Tijssen et al.

(10) Patent No.: US 10,146,407 B2
(45) Date of Patent: Dec. 4, 2018

(54) PHYSICAL OBJECT DETECTION AND TOUCHSCREEN INTERACTION

(71) Applicant: ADOBE SYSTEMS INCORPORATED, San Jose, CA (US)

(72) Inventors: Remon Tijssen, Mill Valley, CA (US); Timothy W. Kukulski, Oakland, CA (US); Michael W. Gough, Middletown, CA (US); Geoffrey Charles Dowd, San Francisco, CA (US); Gregory Cy Muscolino, Novato, CA (US)

(73) Assignee: Adobe Systems Incorporated, San Jose, CA (US)

( * ) Notice: Subject to any disclaimer, the term of this patent is extended or adjusted under 35 U.S.C. 154(b) by 155 days.

(21) Appl. No.: 14/042,346

(22) Filed: Sep. 30, 2013

(65) Prior Publication Data
US 2014/0327628 A1  Nov. 6, 2014

Related U.S. Application Data

(60) Provisional application No. 61/818,858, filed on May 2, 2013.

(51) Int. Cl.
G06F 3/0484 (2013.01)
G06F 3/0488 (2013.01)

(52) U.S. Cl.
CPC .......... G06F 3/0484 (2013.01); G06F 3/0488 (2013.01)

(58) Field of Classification Search
CPC .............................. G06F 3/0484; G06F 3/0488
(Continued)

(56) References Cited

U.S. PATENT DOCUMENTS

2008/0042993 A1* 2/2008 Jaeger .................. G06F 3/0416
                                                345/173
2010/0066690 A1* 3/2010 Beamish ............. G06F 3/03547
                                                345/173
(Continued)

FOREIGN PATENT DOCUMENTS

CN    104133581 A    11/2014
DE    102014006318 A1  11/2014
(Continued)

OTHER PUBLICATIONS

Augmenting Interactive Tables with Mice & Keyboards, by Hartmann et al. UIST 09 Oct. 4-7, 2009. http://research.microsoft.com/pubs/81153/mice%20and%20keyboards%20uist%202009.pdf.
(Continued)

*Primary Examiner* — Vinh T Lam
(74) *Attorney, Agent, or Firm* — Shook, Hardy & Bacon L.L.P.

(57) ABSTRACT

An input device, such as a multifunction straight edge or a keyboard, has a recognizable contact shape when placed on a touchscreen display surface of a computing device. The contact shape of the input device can be a defined pattern of contact points, and a location and orientation of the input device on the touchscreen display surface is determinable from the defined pattern of the contact points. The input device includes an interaction module that interfaces with a companion module of the computing device. The companion module can initiate a display of an object responsive to the input device being recognized on the touchscreen display surface. The interaction module can receive a user input to the input device, and communicate the user input to the companion module of the computing device to modify the display of the object on the touchscreen display surface.

20 Claims, 10 Drawing Sheets

(58) Field of Classification Search
USPC .................................. 345/173; 178/18.01
See application file for complete search history.

(56) References Cited

U.S. PATENT DOCUMENTS

| | | | |
|---|---|---|---|
| 2010/0110013 A1* | 5/2010 | Li ..................... | G06F 3/0202 345/169 |
| 2010/0302144 A1* | 12/2010 | Burtner ............... | G06F 3/0416 345/157 |
| 2011/0050587 A1* | 3/2011 | Natanzon ............ | G06F 3/04842 345/173 |
| 2011/0095992 A1 | 4/2011 | Yeh | |
| 2011/0095994 A1* | 4/2011 | Birnbaum .......... | G06F 3/03547 345/173 |
| 2011/0117968 A1* | 5/2011 | Eromaki .............. | G06F 1/1616 455/566 |
| 2011/0185320 A1* | 7/2011 | Hinckley ............ | G06F 3/04883 715/863 |
| 2012/0084698 A1* | 4/2012 | Sirpal .................. | G06F 1/1616 715/773 |
| 2012/0127088 A1* | 5/2012 | Pance .................. | G06F 3/016 345/173 |
| 2012/0194457 A1 | 8/2012 | Cannon et al. | |
| 2012/0212422 A1* | 8/2012 | Fang .................. | H04M 1/0254 345/173 |
| 2013/0050110 A1* | 2/2013 | Jan ..................... | H04M 1/72527 345/173 |
| 2013/0093702 A1* | 4/2013 | Argiro .................. | G06F 3/041 345/173 |
| 2013/0120291 A1* | 5/2013 | Baentsch .............. | G06F 3/0416 345/173 |
| 2013/0154947 A1* | 6/2013 | Abrams ............... | G06F 1/1626 345/173 |
| 2013/0241839 A1* | 9/2013 | Walker ................ | G06F 3/04845 345/173 |
| 2013/0290909 A1* | 10/2013 | Gray .................... | G01C 21/00 715/854 |
| 2014/0168177 A1* | 6/2014 | Mkrtchyan ......... | G06F 3/03545 345/179 |
| 2014/0253464 A1* | 9/2014 | Hicks .................. | G06F 3/03545 345/173 |
| 2014/0253521 A1* | 9/2014 | Hicks .................. | G06F 3/03545 345/179 |

FOREIGN PATENT DOCUMENTS

| | | |
|---|---|---|
| GB | 2493139 A | 1/2013 |
| GB | 2516345 A | 1/2015 |

OTHER PUBLICATIONS

Combined Search and Examination Report under Sections 17 & 18(3) dated Nov. 17, 2014 in GB Patent Application No. 1407799.4. 7 pages.

Further Search Report under Section 17 dated Apr. 30, 2015 in GB Patent Application No. 1407799.4. 2 pages.

Weiss et al., "SLAP Widgets: Bridging the Gap Between Virtual and Physical Controls on Tabletops"; CHI '09 Proceedings of the SIGCHI Conference on Human Factors in Computing Systems pp. 481-490, Boston, MA, USA—Apr. 4-9, 2009, ACM New York, NY, USA © 2009.

* cited by examiner

PHYSICAL OBJECT DETECTION AND TOUCHSCREEN INTERACTION

RELATED APPLICATION

This application claims priority to U.S. Provisional Application Ser. No. 61/818,858 filed May 2, 2013 entitled "Physical Object Detection and Touchscreen Interaction" to Tijssen et al., the disclosure of which is incorporated by reference herein in its entirety.

BACKGROUND

Many tablet devices, as well as larger wall-mounted, desktop, or table touchscreen display surfaces, are designed for user interaction with touch gestures and stylus inputs. Even with the ease of use that a touchscreen offers, it can still be difficult to perform some tasks on a tablet or other display surface, such as when creating drawings or performing other tasks that may require precise inputs. Further, although a keyboard and other input devices facilitate user interaction with a computing device, as well as with software applications implemented by a computing device, a user will likely still need to provide other touch and gesture inputs on a touchscreen display surface to start and accomplish tasks while using the devices.

SUMMARY

This Summary introduces features and concepts of physical object detection and touchscreen interaction, which is further described below in the Detailed Description and/or shown in the Figures. This Summary should not be considered to describe essential features of the claimed subject matter, nor used to determine or limit the scope of the claimed subject matter.

Physical object detection and touchscreen interaction is described. In embodiments, an input device, such as a multifunction straight edge or a keyboard, has a recognizable contact shape when placed on a touchscreen display surface of a computing device. The contact shape of the input device can be a defined pattern of contact points, and a location and orientation of the input device on the touchscreen display surface is determinable from the defined pattern of the contact points. The input device includes an interaction module that interfaces with a companion module of the computing device. The companion module can initiate a display of an object responsive to the input device being recognized on the touchscreen display surface. The interaction module can receive a user input to the input device, and communicate the user input to the companion module of the computing device to modify the display of the object on the touchscreen display surface.

In embodiments, the input device may be a multifunction straight edge that includes the interaction module, which communicates with the companion module implemented by the computing device and is operable with the touchscreen display surface. For example, the interaction module of the multifunction straight edge can communicate an identifier of the multifunction straight edge, as well as user inputs, to the companion module of the computing device. The multifunction straight edge can include selectable shapes and/or other types of drawing template guides. A user shape input can be received on the multifunction straight edge, and a shape object that corresponds to the user shape input is then displayed on the touchscreen display surface.

The shape object can be displayed on the touchscreen display surface as a drawing shape template and/or as stylus guide lines for stylus inputs while the multifunction straight edge is on the touchscreen display surface. The shape object that is displayed on the touchscreen display surface is associated with the multifunction straight edge and a display position relative to the multifunction straight edge is maintained. The shape object is tethered to the multifunction straight edge to maintain the display position relative to the multifunction straight edge, and the shape object can move and/or rotate with the multifunction straight edge on the touchscreen display surface. When the multifunction straight edge is removed from the touchscreen display surface, the shape object may then not be displayed. Alternatively, the shape object remains displayed as a drawing element on the touchscreen display surface when the multifunction straight edge is removed from the touchscreen display surface.

In embodiments, the input device may be a keyboard that includes the interaction module, which communicates with the companion module implemented by the computing device and is operable with the touchscreen display surface. The interaction module can communicate an identifier of the keyboard, as well as user inputs, to the companion module of the touchscreen display surface. A text object can be created and displayed on the touchscreen display surface when the keyboard is placed on the touchscreen display surface. User key inputs to the keyboard are then communicated for display as alphanumeric characters in the text object on the touchscreen display surface. Alternatively, the text object may be initiated for display on the touchscreen display surface responsive to the user key inputs to the keyboard.

The text object that is displayed on the touchscreen display surface is associated with the keyboard and a display position relative to the keyboard is maintained. The text object can move and/or rotate with the keyboard to maintain the display position relative to the keyboard on the touchscreen display surface. A text object that is associated with the keyboard may be moved away from the keyboard, such as when a user selects and drags the text object to disassociate the text object from the keyboard. An additional text object can then be created and displayed on the touchscreen display surface, and associated with the keyboard, ready for user input.

A text object that is associated with the keyboard may be no longer displayed when the keyboard is removed from the touchscreen display surface, and the text object can be redisplayed responsive to the keyboard being replaced back on the touchscreen display surface. Text objects may also be displayed on the touchscreen display surface prior to the keyboard being placed on the touchscreen display surface. When the keyboard is placed on the touchscreen display surface, a displayed text object can be selected and associated with the keyboard based on proximity of the keyboard to the displayed text object to enable editing the text.

A user interface panel can also be initiated for display on the touchscreen display surface responsive to the keyboard being placed on the touchscreen display surface. The user interface panel may include selectable text editing options and/or selectable links to previously created text objects for user selection to edit a previously created text object. The user interface panel is also associated with the keyboard and a display position relative to the keyboard is maintained, such that the user interface panel can move and/or rotate with the keyboard to maintain the display position relative to the keyboard on the touchscreen display surface.

BRIEF DESCRIPTION OF THE DRAWINGS

Embodiments of physical object detection and touchscreen interaction are described with reference to the following Figures. The same numbers may be used throughout to reference like features and components that are shown in the Figures.

DETAILED DESCRIPTION

Embodiments of physical object detection and touchscreen interaction are described. An input device, such as a keyboard, multifunctional straight edge, or video jog shuttle may be placed on a touchscreen display surface, which initiates user interface elements and/or displayed objects for user interaction, such as text objects and shape objects that are displayed on the touchscreen display surface. For example, a keyboard can be placed on a touchscreen display surface and a text object is automatically generated and displayed, ready for user input. Similarly, a multifunction straight edge can be placed on a touchscreen display surface, such as integrated in a tablet computing device, and a shape object that corresponds to a user template input is displayed on the touchscreen display surface.

While features and concepts of physical object detection and touchscreen interaction can be implemented in any number of different devices, systems, networks, environments, and/or configurations, embodiments of physical object detection and touchscreen interaction are described in the context of the following example devices, systems, and methods.

Figure 1:
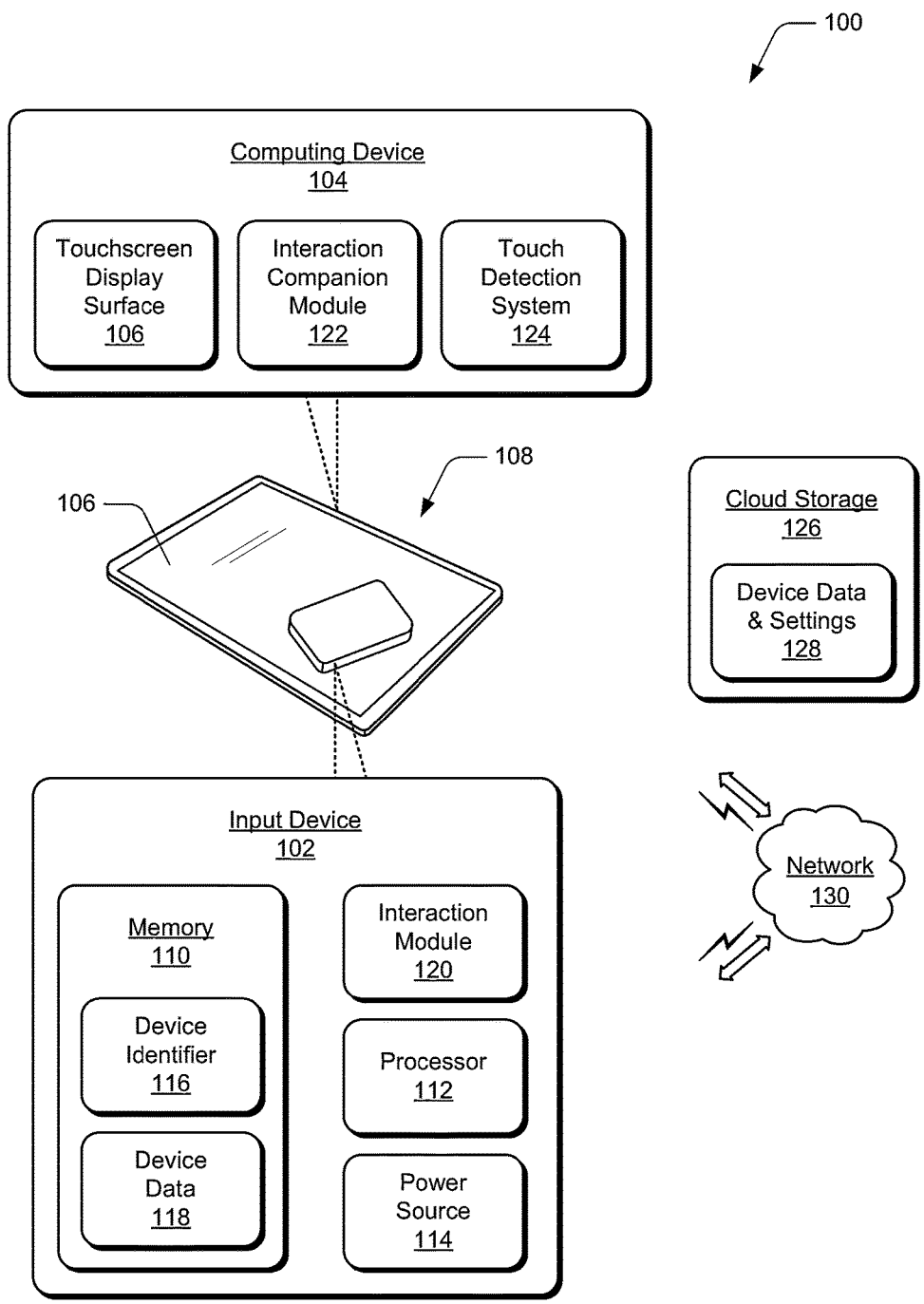
FIG. 1 illustrates an example system in which embodiments of physical object detection and touchscreen interaction can be implemented.

FIG. 1 illustrates an example system 100 of physical object detection and touchscreen interaction in accordance with one or more embodiments. The example system includes an input device 102 and a computing device 104. The input device 102 may be any type of physical device utilized by a user to interface with a computing device and displayed objects. Examples of the input device 102 include a multifunctional straight edge as described with reference to FIGS. 2-4, a keyboard as described with reference to FIGS. 5-9, a video jog shuttle (not shown), and any other type of input device. The computing device 104 may be implemented as any one or combination of a wired or wireless device, such as a mobile phone, tablet, computing, communication, entertainment, gaming, media playback, and/or other type of device. The computing device 104 includes a touchscreen display surface 106 on which the input device is placed for touchscreen interaction, as shown at 108. As described herein, the touchscreen display surface may be any one or combination of a capacitive touchscreen display integrated in a computing device or any type of a digital drafting table, free-standing desktop, or table touchscreen display surface.

Any of the devices can be implemented with various components, such as a processing system and memory, as well as any number and combination of differing components as further described with reference to the example device shown in FIG. 10. For example, the input device 102 includes a memory 110, a processor 112, and a power source 114, such as any type of battery or other power source that may be implemented in an input device. The memory 110 of the input device can maintain a device identifier 116 of the device, as well as device data 118, such as configurable settings of the device, as well as user interface data and settings.

The input device 102 includes an interaction module 120 that can be maintained as executable instructions (e.g., a software application, component, or module) stored on computer-readable storage media, such as any suitable memory device or electronic data storage (e.g., the memory 110). Additionally, the interaction module can be executed with the processor 112 of the input device to implement embodiments of physical object detection and touchscreen interaction. Similarly, the computing device 104 can include an interaction companion module 122 as executable instructions (e.g., a software application, component, or module) that interfaces with the interaction module 120 of the input device 102 when the input device is placed for touchscreen interaction on the touchscreen display surface 106 of the computing device 104.

In embodiments, either one or a combination of the interaction module 120 and the interaction companion module 122 implement embodiments and techniques of physical object detection and touchscreen interaction. In implementations, the interaction companion module of the computing device 104 may be a software application that interfaces with the interaction module 120 of the input device 102 via application programming interfaces (APIs). The interaction module 120 of the input device 102 and/or the interaction companion module 122 of the computing device 104 are implemented to perform the various method operations described with reference to FIGS. 3, 4, and 7-9.

The computing device 104 can also include a touch detection system 124 that detects capacitive contact of an input device 102 on the touchscreen display surface 106, such as when a keyboard, multifunction straight edge, or other type of input device is placed on the touchscreen display surface. The touch detection system can also interface with the interaction companion module 122 of the computing device 104 and/or with the interaction module 120 of the input device 102. In embodiments, the input device 102, such as a multifunction straight edge or a keyboard, has a recognizable contact shape when placed on the touchscreen display surface 106 of the computing device. The contact shape of the input device can be a defined pattern of contact points, and a location and orientation of the input device on the touchscreen display surface is determinable from the defined pattern of the contact points.

In implementations, the input device 102 may also communicate to store the device data 118, user settings, and/or any other type of configuration information in network-based data storage (also referred to as cloud-based, or "in the cloud"), shown as cloud storage 126 that stores device data and settings 128. For example, user interface settings associated with the keyboard shown in FIGS. 5 and 6 may be stored in the cloud storage 126 and accessed by the keyboard (e.g., an input device 102) when placed for touchscreen interaction on a touchscreen display surface. Similarly, user and device settings associated with the multifunctional straight edge shown in FIG. 2 may be stored in the cloud storage 126 and accessed by the multifunctional straight edge (e.g., an input device 102) when placed for touchscreen interaction on a touchscreen display surface.

Any of the devices described herein can communicate via a network 130, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Figure 2:
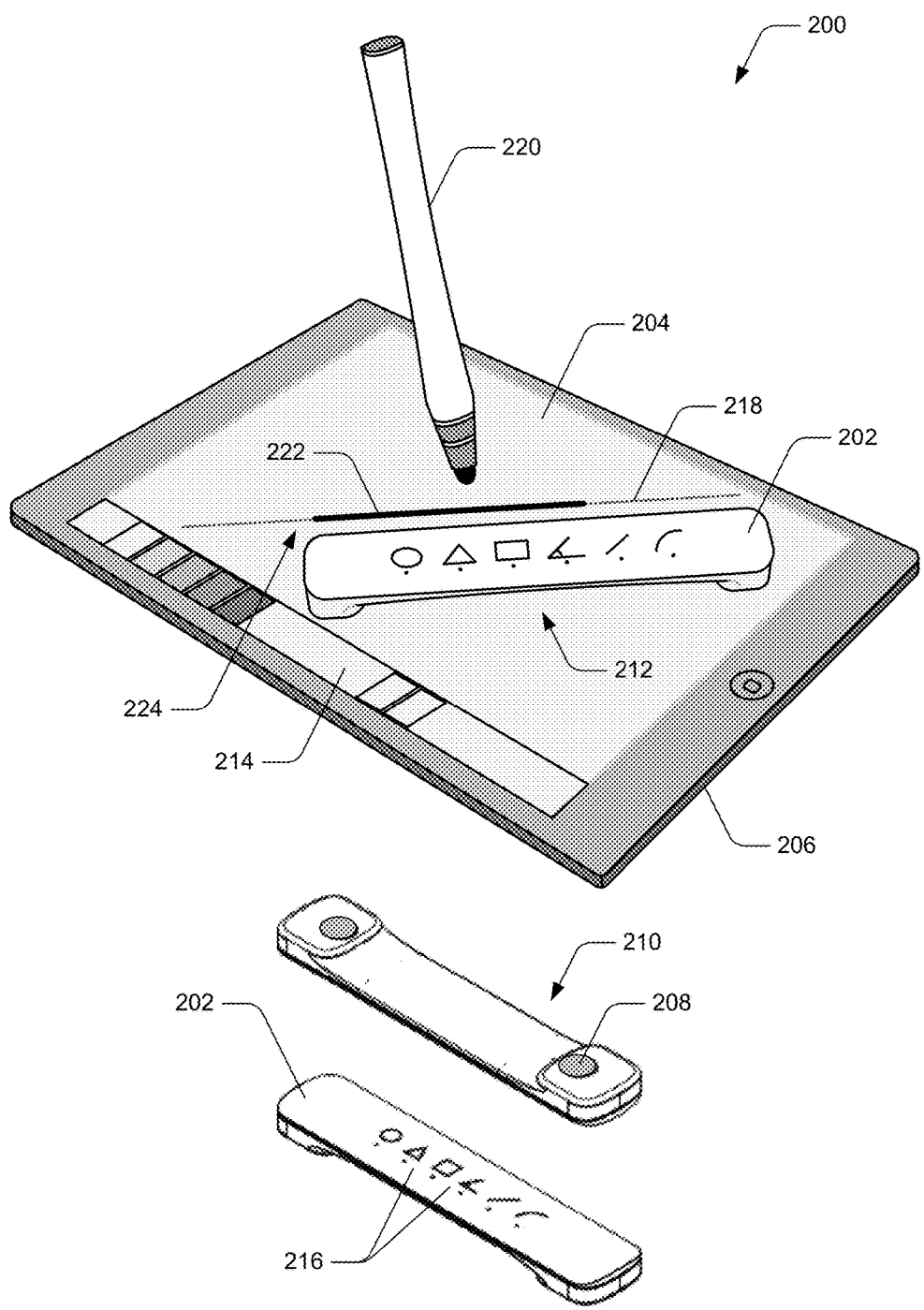
FIG. 2 illustrates an example of physical object detection and touchscreen interaction with a multifunctional straight edge on a touchscreen display surface in accordance with one or more embodiments.

FIG. 2 illustrates an example 200 of physical object detection and touchscreen interaction with a multifunctional straight edge 202 on a touchscreen display surface 204, such as integrated in a tablet device 206. The multifunction straight edge 202 is an example of the input device 102 and the tablet device 206 is an example of the computing device 104 described with reference to FIG. 1. In this example 200, the multifunctional straight edge 202 is a wireless device that communicates with the touchscreen display surface, such as via Bluetooth™, Bluetooth Low Energy (BTLE), WiFi™, or another type of wireless communication. The touchscreen display surface 204 is an example of a capacitive touchscreen display integrated in a portable computing device, such as the tablet device 206.

The multifunctional straight edge 202 has a defined pattern of contact points 208 (e.g., capacitive touch points) as shown in the view 210, and the pattern of the contact points are recognizable as a multifunction straight edge. The pattern of the contact points 208 are recognized on the touchscreen display surface 204 when the multifunctional straight edge is placed on the touchscreen display surface, as shown at 212. Alternatively or in addition, any configuration, physical feature, or electronic feature of the multifunction straight edge can be recognized, such as a recognizable contact shape of the multifunction straight edge when placed on the touchscreen display surface. The location and orientation of the multifunction straight edge on the touchscreen display surface is determinable from a recognizable contact shape and/or the defined pattern of the contact points. In implementations, a touch detection system of the multifunction straight edge 202 can recognize the device on the touchscreen display surface 204 when the contact points 208 remain steady in-place for a threshold duration of time. The contact is then distinguishable from a motion gesture, for example, that may be initiated by a user with two fingers placed on the touchscreen display surface, such as for a pinch to zoom or expand motion gesture.

In implementations, the multifunction straight edge 202 is a consumer electronic device that interacts and/or interfaces with the tablet device 206 and the touchscreen display surface 204 to lay out various shapes as templates to assist a user drawing with a stylus or finger input. A user interface 214 of digital drawing tools can also be initiated for display on the touchscreen display surface 204 responsive to the multifunction straight edge being placed on the touchscreen display surface of the tablet device. The multifunction straight edge 202 includes selectable shapes 216 and/or other types of drawing template guides. The multifunction straight edge may also be implemented to include selectable and/or customizable templates, to include but not limited to, drawing, drafting, French curves, architectural, electrical, carpentry, image stamps, and/or any other type of on-screen template application that is augmented or facilitated by the multifunction straight edge.

The multifunction straight edge 202 can augment the touchscreen display surface 204 and device software of the tablet device 206 in any way that the software can make use of interactions with the multifunction straight edge. As described with reference to the example system shown in FIG. 1, the multifunction straight edge 202 can include an interaction module (e.g., a software component or application) that communicates with a companion module implemented by the tablet device and operable with the touchscreen display surface. For example, the interaction module of the multifunction straight edge can communicate an identifier of the multifunction straight edge, as well as user inputs, to the companion module of the computing device that includes the touchscreen display surface.

A user can select a shape 216 (or other type of drawing template guide) as a user input on the multifunction straight edge 202, and a shape object that corresponds to the user shape input is displayed on the touchscreen display surface 204 of the tablet device. For example, a user may select the line shape 216 on the multifunction straight edge, and the shape object 218 is displayed on the touchscreen display surface 204 as a drawing shape template and/or stylus guide lines for stylus inputs while the multifunction straight edge is on the touchscreen display surface. The user can then use the stylus 220, a finger, or other drawing tool to draw a line 222 over the shape object 218 (e.g., the stylus guide line). In this example, the shape object 218 is illustrated as a thinner grey line than the thicker black line 222 drawn by a user with the stylus.

The shape object 218 that is displayed on the touchscreen display surface 204 is associated with the multifunction straight edge 202 and a display position 224 relative to the multifunction straight edge is maintained. The shape object is tethered to the multifunction straight edge to maintain the display position relative to the multifunction straight edge, and the shape object can move and/or rotate with the multifunction straight edge on the touchscreen display surface. Additionally, any of the displayed shape objects can be selectable and include corner and/or edge handles to reshape, resize, and/or reposition a shape object on the touchscreen display surface.

In implementations, the multifunction straight edge can be removed from the touchscreen display surface, and the shape object is then not displayed (i.e., the drawing template or stylus guide disappears from the touchscreen display surface). Alternatively in other implementations, the shape object can remain displayed as a drawing element on the touchscreen display surface when the multifunction straight edge is removed from the touchscreen display surface. For example, the shape object may first be displayed as a drawing template, and then remain displayed and included as part of a drawing on the touchscreen display surface.

Example methods 300, 400, 700, 800, and 900 are described with reference to respective FIGS. 3, 4, 7, 8, and 9 in accordance with one or more embodiments of physical object detection and touchscreen interaction. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 3:
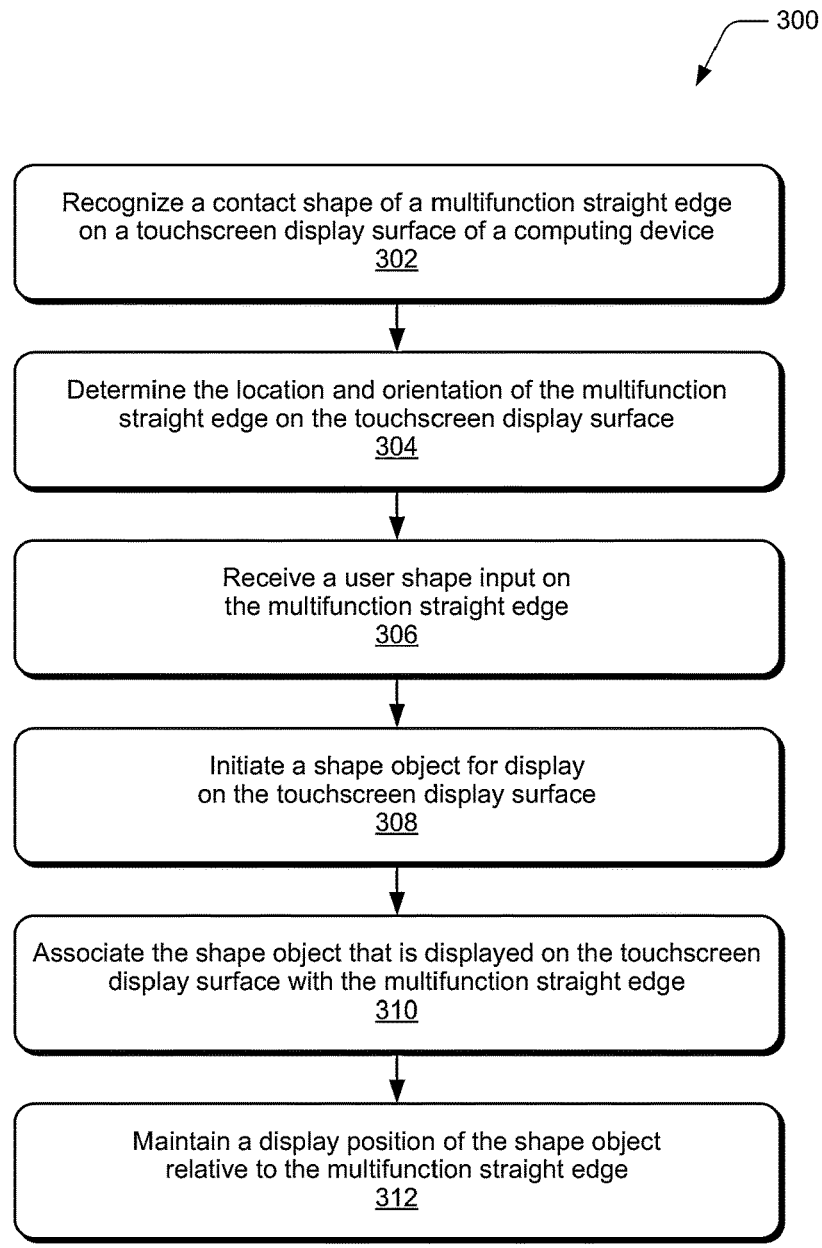
FIGS. 3 and 4 illustrate example method(s) of physical object detection and touchscreen interaction with reference to a multifunction straight edge on a touchscreen display surface in accordance with one or more embodiments.

FIG. 3 illustrates example method(s) 300 of physical object detection and touchscreen interaction, and is generally described with reference to multifunction straight edge interaction on a touchscreen display surface. The order in which the method is described is not intended to be construed as a limitation, and any number or combination of the method operations can be combined in any order to implement a method, or an alternate method.

At 302, a contact shape of a multifunction straight edge is recognized on a touchscreen display surface of a computing device. For example, the interaction companion module 122 (FIG. 1) of the tablet device 206 (FIG. 2) recognizes a contact shape of the multifunction straight edge 202 when the input device is placed on the touchscreen display surface 204 of the tablet device (e.g., a computing device). In an implementation, the multifunction straight edge includes the defined pattern of contact points 208 that are recognized as the contact shape of the multifunction straight edge. Alternatively or in addition, any configuration, physical feature, or electronic feature of the multifunction straight edge can be recognized as the contact shape of the input device when placed on the touchscreen display surface.

At 304, the location and orientation of the multifunction straight edge on the touchscreen display surface is determined. For example, the interaction companion module 122 of the tablet device 206 determines the location and orientation of the multifunction straight edge 202 on the touchscreen display surface 204 of the tablet device, such as from a recognizable contact shape of the multifunction straight edge and/or based on the defined pattern of the contact points 208.

At 306, a user shape input is received on the multifunction straight edge. For example, the interaction module 120 of the multifunction straight edge 202 (e.g., an input device 102) receives a user shape input, such as a touch contact of a shape 216 (or other type of drawing template guide) as a user input on the multifunction straight edge 202.

At 308, a shape object is initiated for display on the touchscreen display surface. For example, the interaction module 120 of the multifunction straight edge 202 communicates the user shape input (received at 306) to the interaction companion module 122 of the tablet device 206, which initiates the shape object for display. A user may select the line shape 216 on the multifunction straight edge, and the shape object 218 is displayed on the touchscreen display surface 204 as a drawing shape template and/or stylus guide lines for stylus inputs while the multifunction straight edge is on the touchscreen display surface. This can include displaying the shape object as a drawing shape template on the touchscreen display surface while the multifunction straight edge is on the touchscreen display surface. Alternatively or in addition, this can include displaying the shape object as one or more stylus guide lines on the touchscreen display surface as a guide for stylus inputs.

At 310, the shape object that is displayed on the touchscreen display surface is associated with the multifunction straight edge and, at 312, a display position of the shape object is maintained relative to the multifunction straight edge. For example, the interaction companion module 122 of the tablet device 206 associates the shape object 218 with the multifunction straight edge 202, and tethers the shape object to the multifunction straight edge to maintain the display position relative to the multifunction straight edge on the touchscreen display surface. The shape object moves and/or rotates with the multifunction straight edge on the touchscreen display surface.

Figure 4:
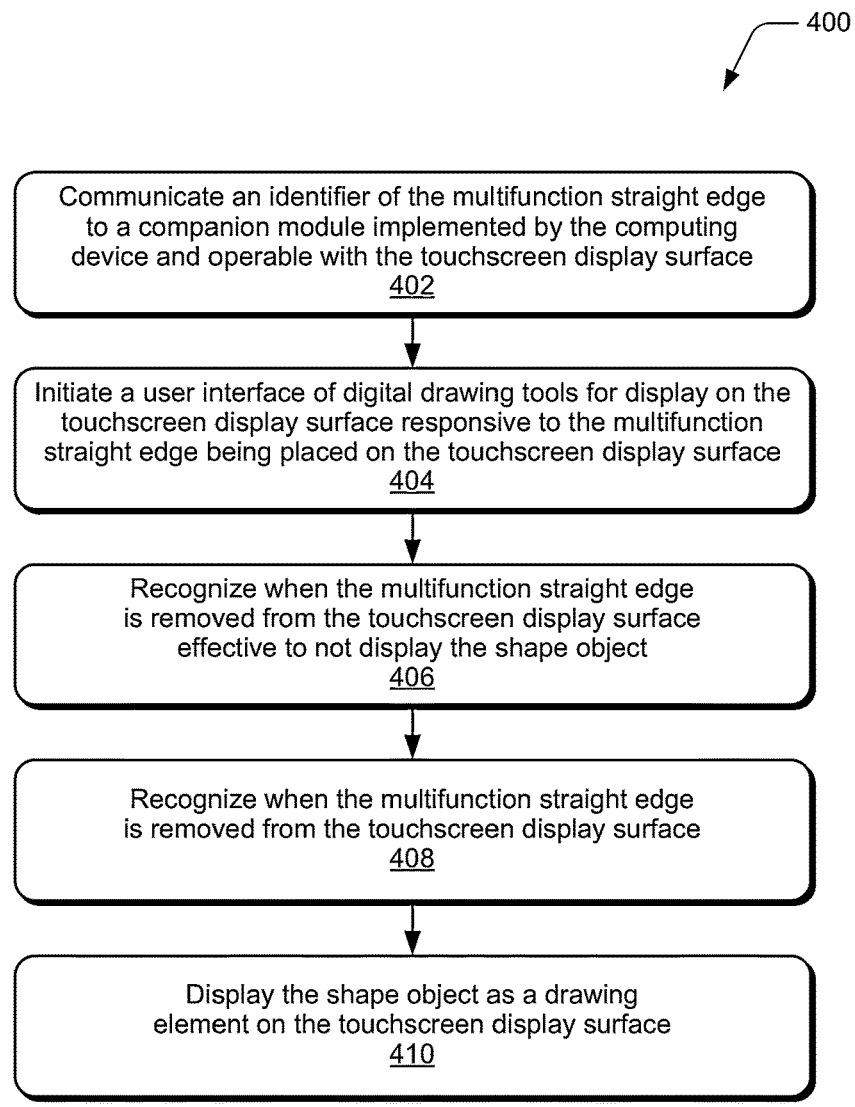

FIG. 4 illustrates example method(s) 400 of physical object detection and touchscreen interaction, and is generally described with reference to multifunction straight edge interaction on a touchscreen display surface. The order in which the method is described is not intended to be construed as a limitation, and any number or combination of the method operations can be combined in any order to implement a method, or an alternate method.

At 402, an identifier of the multifunction straight edge is communicated to the companion module implemented by the computing device and operable with the touchscreen display surface. For example, the interaction module 120 (FIG. 1) of the multifunction straight edge 202 (FIG. 2) communicates the device identifier 116 of the input device (e.g., the multifunction straight edge) to the interaction companion module 122 of the tablet device 206 (e.g., a computing device).

At 404, a user interface of digital drawing tools is initiated for display on the touchscreen display surface responsive to the multifunction straight edge being placed on the touchscreen display surface. For example, the interaction companion module 122 of the tablet device 206 initiates the user interface 214 of digital drawing tools for display on the touchscreen display surface 204 of the tablet device when the multifunction straight edge 202 is placed on the touchscreen display surface.

At 406, the multifunction straight edge being removed from the touchscreen display surface is recognized effective to not display the shape object. For example, the interaction companion module 122 of the tablet device 206 recognizes the multifunction straight edge 202 being removed from the touchscreen display surface 204, which is effective to not display the shape object (i.e., the drawing template or stylus guide disappears from the touchscreen display surface).

As an alternative to not displaying the shape object when the multifunction straight edge is removed from the touchscreen display surface (at 406), the multifunction straight edge is recognized as being removed from the touchscreen display surface at 408 and, at 410, the shape object is displayed as a drawing element on the touchscreen display surface. For example, the interaction companion module 122 of the tablet device 206 recognizes the multifunction straight edge 202 being removed from the touchscreen display surface 204, and the shape object remains displayed and is included as part of a drawing on the touchscreen display surface.

Figure 5:
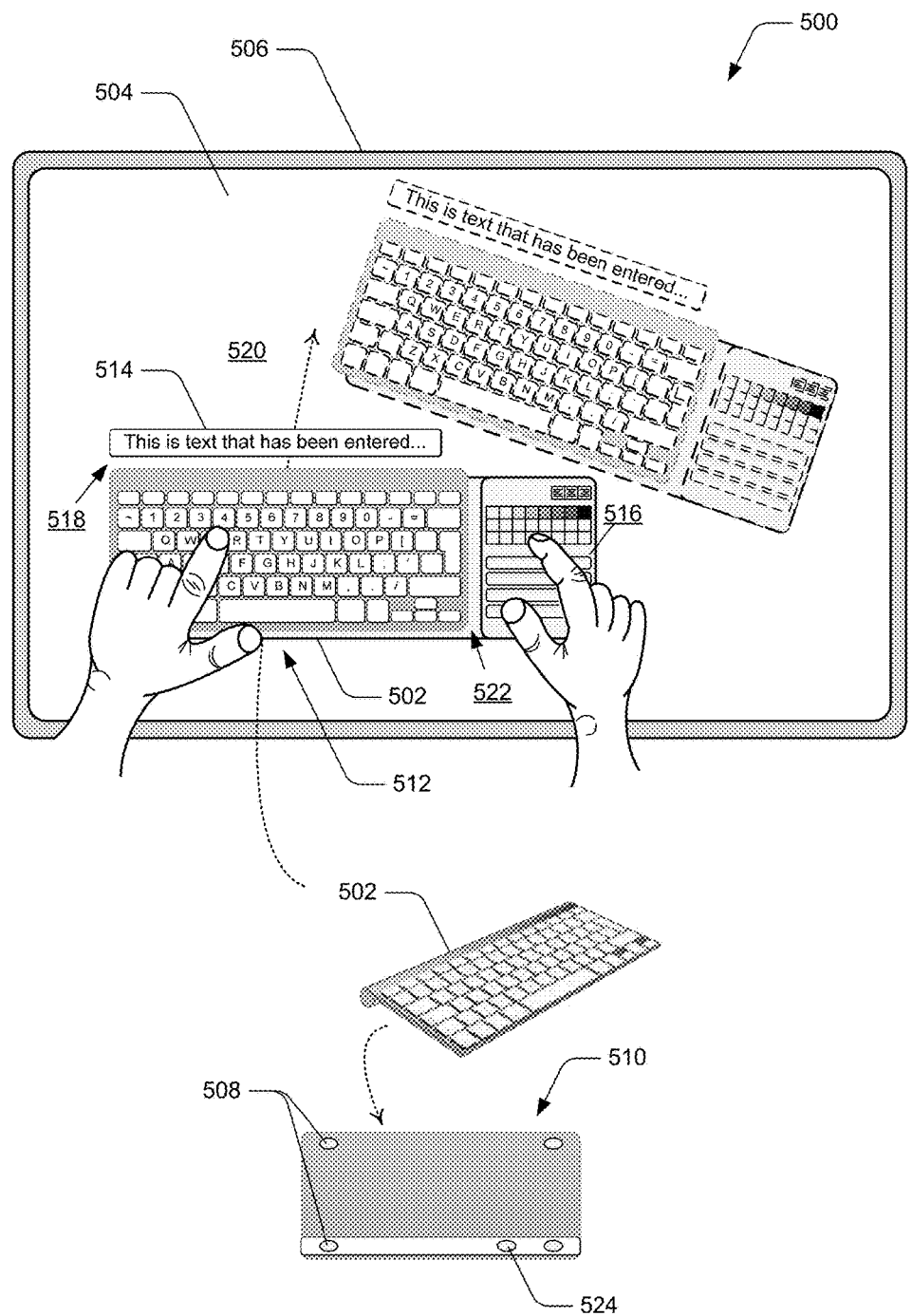
FIG. 5 illustrates an example of physical object detection and touchscreen interaction with a keyboard on a touchscreen display surface in accordance with one or more embodiments.

FIG. 5 illustrates an example 500 of physical object detection and touchscreen interaction with a keyboard 502 on a touchscreen display surface 504, such as a capacitive touchscreen display integrated in a computing device 506, such as any type of a digital drafting table, free-standing desktop, or table touchscreen display surface. The keyboard 502 is an example of the input device 102 and the computing device 506 is an example of the computing device 104 described with reference to FIG. 1. In this example, the keyboard 502 is a wireless device that communicates with the touchscreen display surface, such as via Bluetooth™, Bluetooth Low Energy (BTLE), WiFi™, or another type of wireless communication.

The keyboard 502 has a defined pattern of contact points 508 (e.g., capacitive touch points) on the bottom of the keyboard, as shown at 510, and the pattern of the contact points are recognizable as a keyboard. The pattern of the contact points 508 are recognized on the touchscreen display surface 504 when the keyboard is placed on the touchscreen display surface, as shown at 512. Having three or more of the recognizable contact points avoids the touch detection system of the keyboard detecting a motion gesture as the keyboard, such as described above with reference to the multifunction straight edge that is implemented with the two recognizable contact points. Alternatively or in addition, any configuration, physical feature, or electronic feature of the keyboard can be recognized, such as a recognizable contact shape of the keyboard when placed on the touchscreen display surface. The location and orientation of the keyboard on the touchscreen display surface is determinable from a recognizable contact shape and/or the defined pattern of the contact points.

The keyboard 502 can augment the touchscreen display surface 504 and device software of the touchscreen display surface (e.g., when implemented as a computing device 506) in any way that the software can make use of interactions with the keyboard. As described with reference to the example system shown in FIG. 1, the keyboard 502 can include an interaction module (e.g., a software component or application) that communicates with a companion module, which is implemented and operable with the touchscreen display surface. For example, the interaction module of the keyboard can communicate an identifier of the keyboard, as well as user keyboard inputs, to the companion module of the touchscreen display surface, or to the computing device that includes the touchscreen display surface.

A text object 514 can be displayed on the touchscreen display surface 504 when the keyboard 502 is placed on the touchscreen display surface, as shown at 512. In embodiments, the keyboard itself initiates the text object without a user having to navigate a menu and select an option to create the text object. The text object is automatically generated and displayed on the touchscreen display surface, ready for user input, which eliminates one or more user inputs. User key inputs to the keyboard are then communicated for display as alphanumeric characters in the text object on the touchscreen display surface. Alternatively, the text object may be initiated for display on the touchscreen display surface responsive to the user key inputs to the keyboard. A user interface panel 516 can also be initiated for display on the touchscreen display surface 504 responsive to the keyboard 502 being placed on the touchscreen display surface. The user interface panel 516 may include selectable text editing options and/or selectable links to previously created text objects for user selection to edit a previously created text object.

The text object 514 that is displayed on the touchscreen display surface 504 is associated with the keyboard 502, and a display position 518 relative to the keyboard is maintained. The text object can move and/or rotate 520 with the keyboard to maintain the display position relative to the keyboard on the touchscreen display surface. The user interface panel 516 is also associated with the keyboard, and a display position 522 relative to the keyboard is maintained, such that the user interface panel can also move and/or rotate 520 with the keyboard to maintain the display position relative to the keyboard on the touchscreen display surface.

In implementations, a text object that is associated with the keyboard 502 may be moved away from the keyboard, such as when a user selects and drags the text object 514 to disassociate the text object from the keyboard. An additional text object can then be created and displayed on the touchscreen display surface, and associated with the keyboard ready for user input. For example, a user may type a note or email that also has a touch select option, drag the note or email away from the keyboard when done typing, and another text object (e.g., note or email in this example) is automatically created and ready for user keyboard input.

A text object that is associated with the keyboard 502 may no longer be displayed when the keyboard is removed from the touchscreen display surface 504, and the text object can then be redisplayed responsive to the keyboard being replaced back on the touchscreen display surface. As shown and described with reference to FIG. 6, text objects may also be displayed on the touchscreen display surface prior to the keyboard being placed on the touchscreen display surface. When the keyboard is placed on the touchscreen display surface, a displayed text object can be selected and associated with the keyboard based on proximity of the keyboard to the displayed text object to enable editing the text.

In implementations, a larger touchscreen display surface may be used with more than one keyboard, such as when users collaborate on a magazine layout or other project. Each user may place a keyboard on the touchscreen display surface 504, and the companion module (e.g., a software application or module) that is operable with the touchscreen display surface can distinguish between the keyboards. For example, the keyboards can be distinguished based on each of the keyboards having a uniquely positioned contact point 524 in addition to the defined pattern of the contact points 508, as shown at 510. Each user may randomly place an additional contact point 524 on the bottom of a keyboard to uniquely identify the keyboard.

In other implementations, a physical object detected on the touchscreen display surface 504 may include a video jog shuttle placed over a grid of videos that are displayed on the touchscreen display surface. The video jog shuttle can be utilized to directly navigate, review, splice, and otherwise edit the video through time. An on-screen user interface can also be displayed around or in conjunction with a video jog shuttle to facilitate further user interaction with video, such as to select, edit, and trim different sections of the video to combine in a new timeline for further editing.

Figure 6:
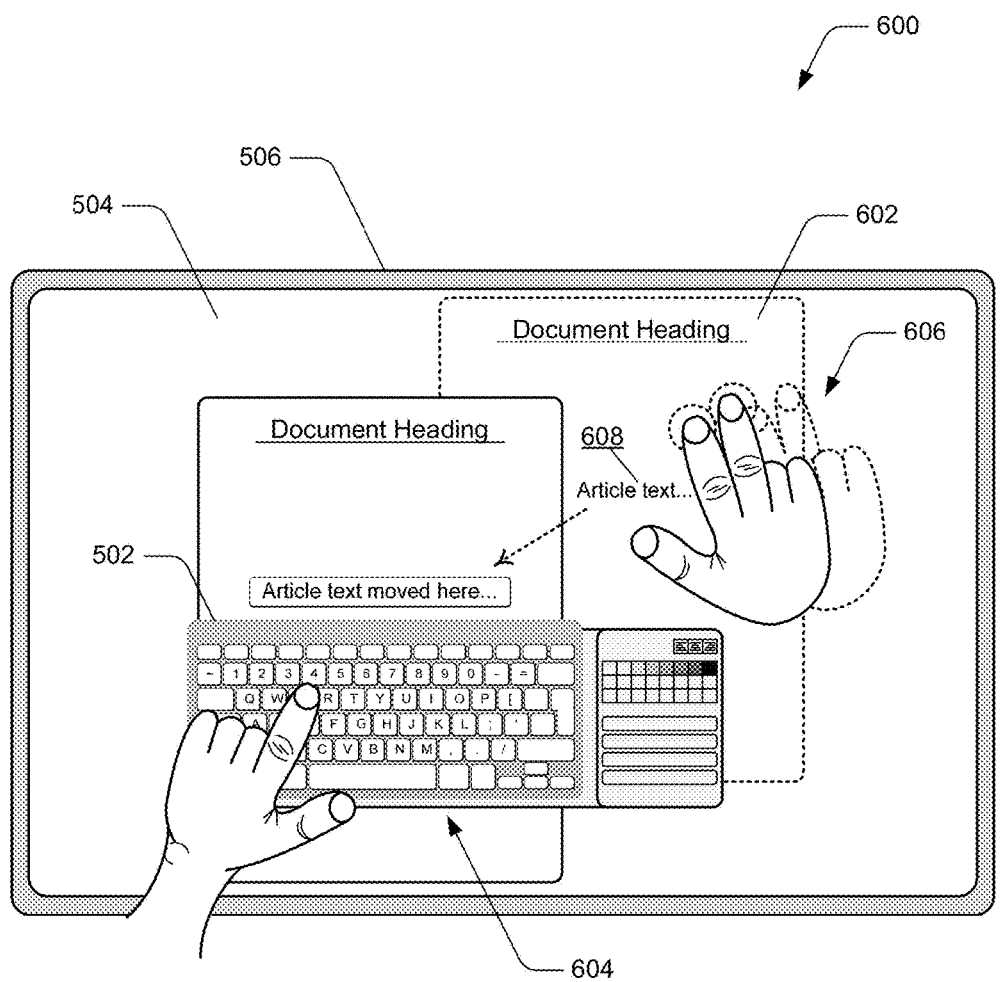
FIG. 6 further illustrates the keyboard on the touchscreen display surface in accordance with one or more embodiments.

FIG. 6 further illustrates an example 600 of physical object detection and touchscreen interaction with the keyboard 502 on the touchscreen display surface 504 of the computing device 506 as described with reference to FIG. 5. In this example, a document 602 is displayed on the touchscreen display surface and the keyboard 502 is placed on the touchscreen display surface, as shown at 604. Text objects may be displayed on the touchscreen display surface prior to the keyboard being placed on the touchscreen display surface. Existing text objects in a page layout for instance can be selected based on proximity of the keyboard by either positioning the keyboard or moving the layout (e.g., the document 602) under the physical keyboard, as shown with a document select and move gesture at 606. Alternatively, a user may just drag the selected text, such as if the text object 608 is not already part of a larger, organized layout.

When the keyboard 502 is placed on the touchscreen display surface 504, a displayed text object 608 can be selected and associated with the keyboard based on proximity of the keyboard to the displayed text object to enable editing the text. The physical placement of the keyboard can instead of creating a new text object, select a current text object, ready for user keyboard input to edit the current text. The text that is closest to the keyboard can be automatically selected.

Figure 7:
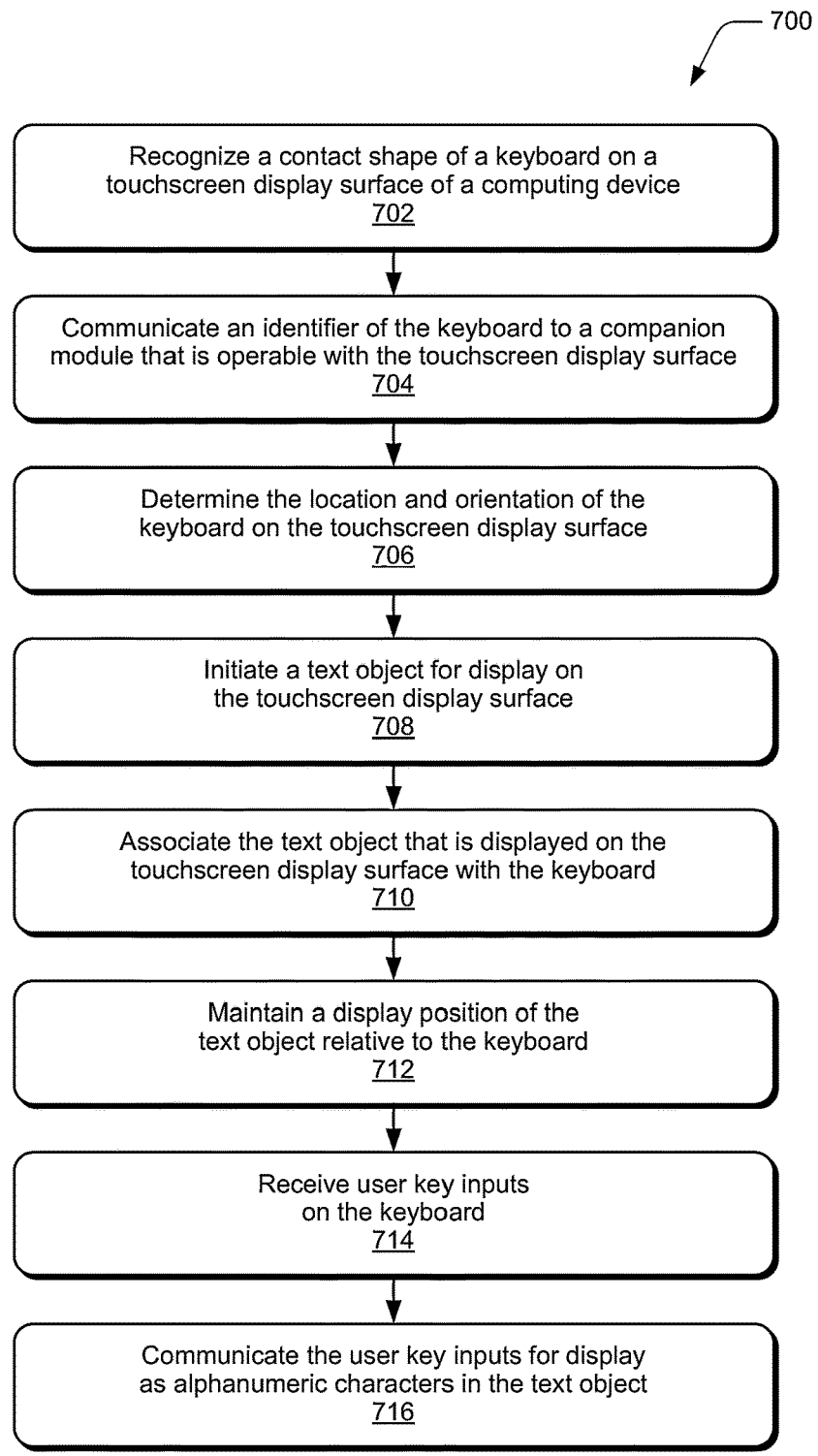
FIGS. 7, 8, and 9 illustrate example method(s) of physical object detection and touchscreen interaction with reference to a keyboard on a touchscreen display surface in accordance with one or more embodiments.

FIG. 7 illustrates example method(s) 700 of physical object detection and touchscreen interaction, and is generally described with reference to keyboard interaction on a touchscreen display surface. The order in which the method is described is not intended to be construed as a limitation, and any number or combination of the method operations can be combined in any order to implement a method, or an alternate method.

At 702, a contact shape of a keyboard is recognized on a touchscreen display surface of a computing device. For example, the interaction companion module 122 (FIG. 1) of the computing device 506 (FIG. 5) recognizes a contact shape of the keyboard 502 when the input device is placed on the touchscreen display surface 504 of the computing device. In an implementation, the keyboard includes the defined pattern of contact points 508 that are recognized as the contact shape of the keyboard. Alternatively or in addition, any configuration, physical feature, or electronic feature of the keyboard can be recognized as the contact shape of the input device when placed on the touchscreen display surface.

At 704, an identifier of the keyboard is communicated to a companion module that is operable with the touchscreen display surface. For example, the interaction module 120 (FIG. 1) of the keyboard 502 (FIG. 5) communicates the device identifier 116 of the input device (e.g., the keyboard) to the interaction companion module 122 of the computing device 506.

At 706, the location and orientation of the keyboard on the touchscreen display surface is determined. For example, the interaction companion module 122 of the computing device 506 determines the location and orientation of the keyboard 502 on the touchscreen display surface 504 of the computing device, such as from a recognizable contact shape of the keyboard and/or based on the defined pattern of the contact points 508.

At 708, a text object is initiated for display on the touchscreen display surface. For example, the interaction companion module 122 of the computing device 506 generates the text object 514 for display on the touchscreen display surface 504 of the computing device 506 when the keyboard 502 is placed on the touchscreen display surface. Alternatively, the text object may be initiated for display on the touchscreen display surface responsive to the user key inputs to the keyboard.

At 710, the text object that is displayed on the touchscreen display surface is associated with the keyboard and, at 712, a display position of the text object is maintained relative to the keyboard. For example, the interaction companion module 122 of the computing device 506 associates the text object 514 with the keyboard 502, and tethers the text object to the keyboard to maintain the display position relative to the keyboard on the touchscreen display surface. The text object moves and/or rotates with the keyboard on the touchscreen display surface.

At 714, user key inputs are received on the keyboard and, at 716, the user key inputs are communicated for display as alphanumeric characters in the text object on the touchscreen display surface. For example, the interaction module 120 of the keyboard 502 (e.g., an input device 102) receives user key inputs to the keyboard, and the interaction module communicates the user key inputs to the interaction companion module 122 of the computing device 506 for display as alphanumeric characters in the text object on the touchscreen display surface.

Figure 8:
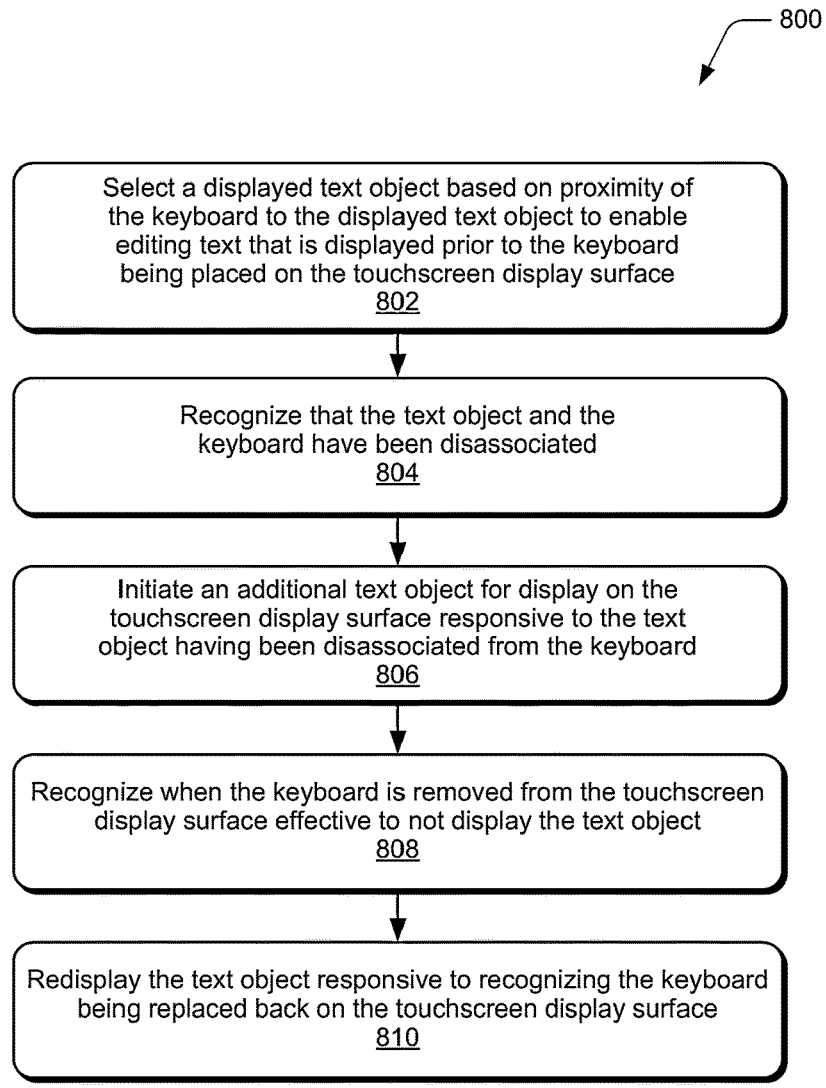

FIG. 8 illustrates example method(s) 800 of physical object detection and touchscreen interaction, and is generally described with reference to keyboard interaction on a touchscreen display surface. The order in which the method is described is not intended to be construed as a limitation, and any number or combination of the method operations can be combined in any order to implement a method, or an alternate method.

At 802, a displayed text object is selected based on proximity of the keyboard to the displayed text object to enable editing text that is displayed prior to the keyboard being placed on the touchscreen display surface. For example, the interaction companion module 122 (FIG. 1) of the computing device 506 (FIG. 5) selects a displayed text object 608 (FIG. 6) based on proximity of the keyboard 502 to the displayed text object to enable editing text that is displayed prior to the keyboard being placed on the touchscreen display surface. When the keyboard 502 is placed on the touchscreen display surface 504, a displayed text object 608 can be selected and associated with the keyboard based on proximity of the keyboard to the displayed text object.

At 804, the text object is recognized as having been disassociated from the keyboard and, at 806, an additional text object is initiated for display on the touchscreen display surface responsive to the text object having been disassociated from the keyboard. For example, the interaction companion module 122 of the computing device 506 recognizes when a text object is disassociated from the keyboard, such as when a user selects and drags the text object 514 to disassociate the text object from the keyboard. An additional text object is then created and displayed on the touchscreen display surface, and associated with the keyboard ready for user input.

At 808, the keyboard is recognized as having been removed from the touchscreen display surface effective to not display the text object. For example, the interaction companion module 122 of the computing device 506 recognizes the keyboard 502 being removed from the touchscreen display surface 504, and the text object that is associated with the keyboard is no longer displayed when the keyboard is removed from the touchscreen display surface. At 810, the text object is redisplayed responsive to recognizing the keyboard being replaced back on the touchscreen display surface. For example, the interaction companion module 122 of the computing device 506 recognizes the keyboard 502 being replaced back on the touchscreen display surface and the text object is redisplayed.

Figure 9:
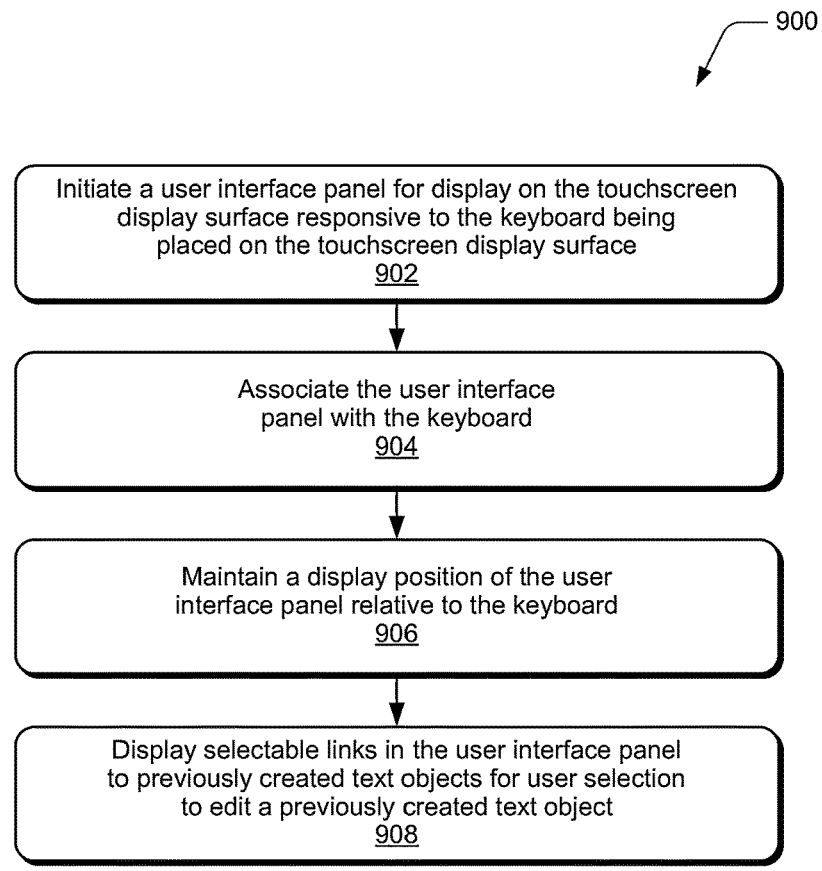

FIG. 9 illustrates example method(s) 900 of physical object detection and touchscreen interaction, and is generally described with reference to keyboard interaction on a touchscreen display surface. The order in which the method is described is not intended to be construed as a limitation, and any number or combination of the method operations can be combined in any order to implement a method, or an alternate method.

At 902, a user interface panel is initiated for display on the touchscreen display surface responsive to the keyboard being placed on the touchscreen display surface. For example, the interaction companion module 122 of the computing device 506 initiates the user interface panel 516 for display on the touchscreen display surface 504 of the computing device when the keyboard 502 is placed on the touchscreen display surface. The user interface panel 516 may include selectable text editing options and/or selectable links to previously created text objects for user selection to edit a previously created text object.

At 904, the user interface panel is associated with the keyboard and, at 906, a display position of the user interface panel relative to the keyboard is maintained. For example, the interaction companion module 122 of the computing device 506 associates the user interface panel 516 with the keyboard 502, and tethers the user interface panel to the keyboard to maintain the display position relative to the keyboard on the touchscreen display surface. The user interface panel moves and/or rotates with the keyboard on the touchscreen display surface. At 908, selectable links are displayed in the user interface panel to previously created text objects for user selection to edit a previously created text object. For example, the interaction companion module 122 of the computing device 506 initiates displaying selectable links in the user interface panel 516 to previously created text objects for user selection to edit a previously created text object.

Figure 10:
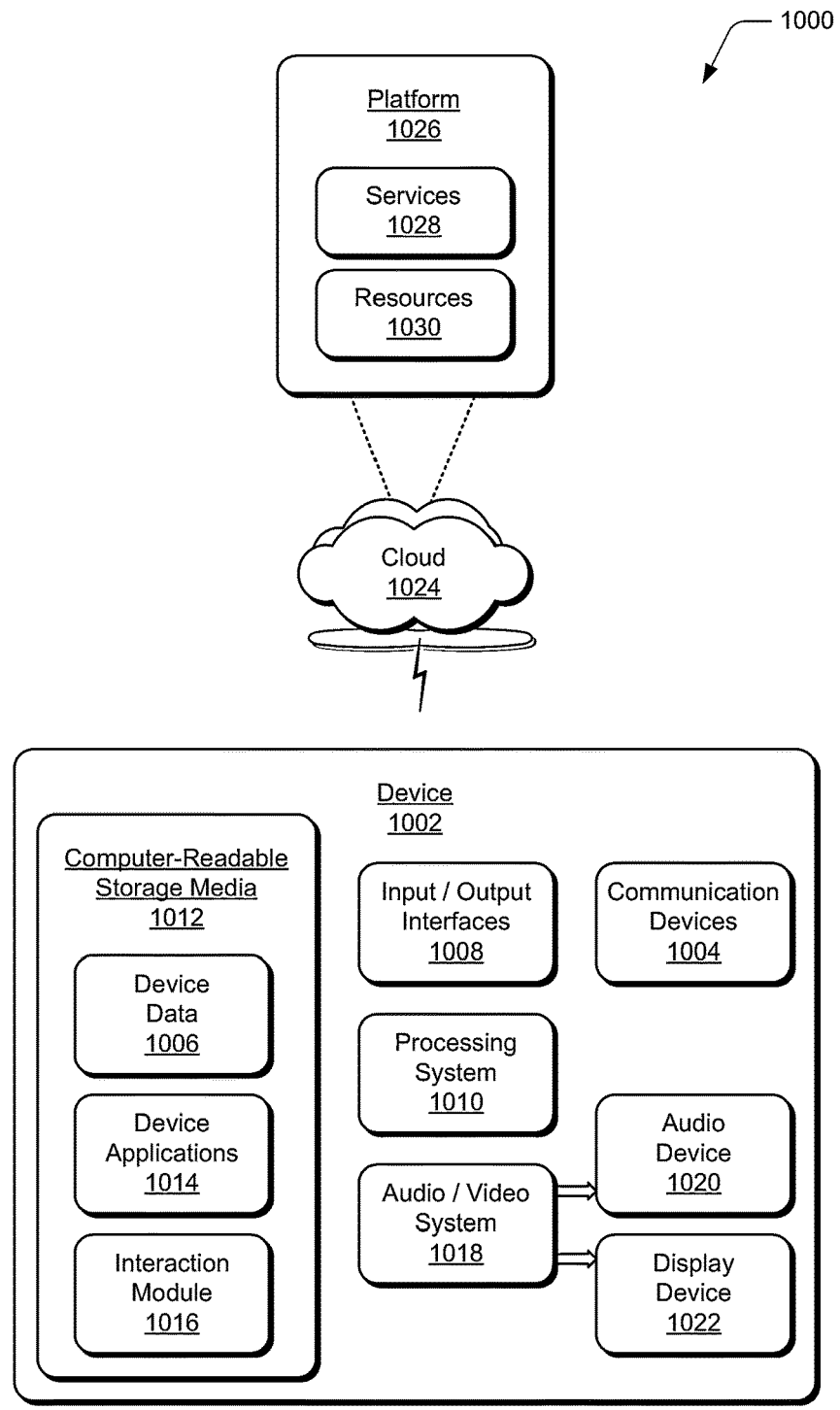
FIG. 10 illustrates an example system with an example device that can implement embodiments of physical object detection and touchscreen interaction.

FIG. 10 illustrates an example system 1000 that includes an example device 1002, which can implement embodiments of physical object detection and touchscreen interaction. The example device 1002 can be implemented as any of the devices and/or services (e.g., server devices) described with reference to the previous FIGS. 1-9, such as any type of an input device, tablet device, computing, communication, entertainment, gaming, media playback, and/or other type of computing device that may be implemented as, or include, a touchscreen display surface. For example, the multifunction straight edge 202, and/or the tablet device 206, as well as the keyboard 502, touchscreen display surface 504, and/or computing device 506 shown in FIGS. 2 and 5 may be implemented as the example device 1002.

The device 1002 includes communication devices 1004 that enable wired and/or wireless communication of device data 1006, such as device settings and data, user data, and user interface configuration settings stored on the device. The device data can include any type of user and/or device data. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices, such as a touchscreen display surface that may be integrated with device 1002. The I/O interfaces also include data input ports via which any type of data, media content, and/or inputs can be received, such as user inputs to the device, as well as any type of audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage media 1012, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 1012 provides storage of the device data 1006 and various device applications 1014, such as an operating system that is maintained as a software application with the computer-readable storage media and executed by the processing system 1010. In this example, the device applications also include an interaction module 1016 that implements embodiments of physical object detection and touchscreen interaction, such as when the example device 1002 is implemented as the multifunction straight edge 202 as shown in FIG. 2 or as the keyboard 502 shown in FIG. 5. Examples of the interaction module 1016 include the interaction module 120 implemented by the input device 102 and the interaction companion module 122 implemented by the computing device 104 as shown and described with reference to FIG. 1.

The device 1002 also includes an audio and/or video system 1018 that generates audio data for an audio device 1020 and/or generates display data for a display device 1022 (e.g., a touchscreen display surface). The audio device and/or the display device include any devices that process, display, and/or otherwise render audio, video, display, and/or image data, such as the image content of a digital photo. In implementations, the audio device and/or the display device are integrated components of the example device 1002. Alternatively, the audio device and/or the display device are external, peripheral components to the example device.

In embodiments, at least part of the techniques described for physical object detection and touchscreen interaction may be implemented in a distributed system, such as over a "cloud" 1024 in a platform 1026. The cloud 1024 includes and/or is representative of the platform 1026 for services 1028 and/or resources 1030. The platform 1026 abstracts underlying functionality of hardware, such as server devices (e.g., included in the services 1028) and/or software resources (e.g., included as the resources 1030), and connects the example device 1002 with other devices, servers, etc.

The resources 1030 may include applications and/or data that can be utilized while computer processing is executed on servers that are remote from the example device 1002. Additionally, the services 1028 and/or the resources 1030 may facilitate subscriber network services, such as over the Internet, a cellular network, or WiFi network. The platform 1026 may also serve to abstract and scale resources to service a demand for the resources 1030 that are implemented via the platform, such as in an interconnected device embodiment with functionality distributed throughout the system 1000. For example, the functionality may be implemented in part at the example device 1002 as well as via the platform 1026 that abstracts the functionality of the cloud 1024.

Although embodiments of physical object detection and touchscreen interaction have been described in language specific to features and/or methods, the appended claims are not necessarily limited to the specific features or methods described. Rather, the specific features and methods are disclosed as example implementations of physical object detection and touchscreen interaction.

The invention claimed is:

1. An input device, comprising:
a plurality of capacitive contact points that collectively present a contact shape that is recognizable as the input device when the plurality of capacitive contact points forming the contact shape is in physical contact with a touchscreen display surface of a computing device;
at least one processor; and
a non-transitory computer storage media storing computer-usable instructions that, when used by at least one processor, cause the at least one processor to:
communicate a received input to the computing device through an established wireless connection when the plurality of capacitive contact points forming the contact shape is in physical contact with the touchscreen display surface, wherein the communication causes the computing device to modify an object displayed on the touchscreen display surface.

2. The input device as recited in claim 1, wherein the contact shape is defined by a pattern of the plurality of capacitive contact points, the pattern corresponding to the input device and being recognizable as the pattern that corresponds to the input device.

3. The input device as recited in claim 1, wherein the input device comprises a multifunction straight edge, the received input corresponds to a selected shape, and to modify the displayed object includes a change to the displayed object into a shape object based on the selected shape.

4. The input device as recited in claim 3, wherein the shape object is a drawing shape template.

5. The input device as recited in claim 3, wherein the shape object is one or more stylus guide lines.

6. The input device as recited in claim 3, wherein the shape object is displayed relative to a physical position and orientation of the contact shape when the plurality of capacitive contact points forming the contact shape is in physical contact with the touchscreen display surface.

7. The input device as recited in claim 3, wherein the shape object remains displayed when the contact shape loses physical contact with the touchscreen display surface.

8. The input device as recited in claim 3, wherein a digital drawing tool user interface is displayed with the displayed object.

9. The input device as recited in claim 1, wherein the input device comprises a keyboard and the object is a text object, wherein the received input corresponds to a received keyboard key input, and to modify the displayed object is based on the received keyboard key input.

10. The input device as recited in claim 9, wherein the text object is selected based on a physical position and orientation of the plurality of capacitive contact points forming the contact shape in physical contact with the touchscreen display surface.

11. The input device as recited in claim 9, wherein a loss of physical contact with the touchscreen display surface causes the text object to be removed from display, and a reestablishment of physical contact with the touchscreen display surface causes the text object to be redisplayed.

12. A computer-implemented method, comprising:
recognizing, by a computing device, an input device that is separate from a touchscreen display surface of the computing device, the input device being recognized based on a plurality of contact points disposed on the input device that form a corresponding contact shape that is in physical contact with the touchscreen display surface;
initiating an object for display, via the touchscreen display surface, at a display position and a display orientation that is relative to a physical position and orientation of the corresponding contact shape;
receiving a user input, from the input device via a wireless connection established therewith, based at least in part on the corresponding contact shape being in physical contact with the touchscreen display surface; and
modifying the displayed object based on the received user input.

13. The method as recited in claim 12, the method further comprising:
determining the physical position and orientation of the corresponding contact shape based on detected positions of the contact points when the corresponding contact shape is in physical contact with the touchscreen display surface.

14. The method as recited in claim 12, wherein the input device comprises a multifunction straight edge, the user input is a selected shape, and the modification of the displayed object includes changing the displayed object into a shape object that corresponds to the selected shape.

15. The method as recited in claim 14, wherein the shape object is one of a drawing shape template or a drawing element, which remains displayed when the corresponding contact shape loses physical contact with the touchscreen display surface.

16. The method as recited in claim 14, further comprising:
providing for display a digital drawing tool user interface that corresponds to the input device, wherein the digital drawing tool user interface is selected based at least in part on a recognition of the corresponding contact shape.

17. The method as recited in claim 12, wherein the input device comprises a physical keyboard, the method further comprising:
initiating the object for display as a text object via the touchscreen display surface based at least in part on the corresponding contact shape of the physical keyboard; and
receiving the user input as at least one keyboard key input to modify alphanumeric characters of the displayed text object.

18. A multifunction straight edge, comprising;
a plurality of capacitive contact points that collectively present a contact shape that corresponds to the multifunction straight edge, wherein the multifunction straight edge is recognizable by a computing device, separate from the multifunction straight edge, based at least in part on the corresponding contact shape being in physical contact with a touchscreen display surface of the computing device;
at least one processor; and
a non-transitory computer storage media storing computer-usable instructions that, when used by at least one processor, cause the at least one processor to:
receive a shape selection input; and cause the computing device to display, on the touchscreen display surface, a shape object that corresponds to the received shape selection input at a display position and a display orientation that are relative to a physical position and a physical orientation of the corresponding contact shape based at least in part on the corresponding contact shape being in physical contact with the touchscreen display surface.

19. The multifunction straight edge as recited in claim 18, wherein the instructions further cause the at least one processor to communicate the received shape selection input to the computing device via an established wireless connection.

20. The input device as recited in claim 1, wherein the input device is separate from the touchscreen display surface of the computing device.

* * * * *